United States Patent
Kelly et al.

(10) Patent No.: US 9,870,019 B2
(45) Date of Patent: Jan. 16, 2018

(54) PEDAL COVER ASSEMBLY AND METHODS OF USE AND MANUFACTURE THEREOF

(71) Applicant: Honda Motor Co., Ltd., Tokyo (JP)

(72) Inventors: Shawn P. Kelly, Powell, OH (US); Angel D. Samalot-Quiles, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 319 days.

(21) Appl. No.: 14/325,052

(22) Filed: Jul. 7, 2014

(65) Prior Publication Data

US 2016/0004272 A1    Jan. 7, 2016

(51) Int. Cl.
  *G05G 1/483*    (2008.04)
  *G05G 1/50*    (2008.04)
  (Continued)

(52) U.S. Cl.
  CPC .............. *G05G 1/483* (2013.01); *B60T 7/06* (2013.01); *G05G 1/506* (2013.01); *G05G 1/60* (2013.01)

(58) Field of Classification Search
  CPC .......... G05G 1/483; G05G 1/487; G05G 1/60; G05G 1/506; G05G 1/50; B60T 7/06;
  (Continued)

(56) References Cited

U.S. PATENT DOCUMENTS 1,175,387 A    3/1916  Stanley
1,292,760 A    1/1919  Grant
(Continued)

FOREIGN PATENT DOCUMENTS

DE    1962400 A1 *    6/1971    ............ G05G 1/483
DE    2064752 A1 *    7/1972    ............ G05G 1/483
(Continued)

OTHER PUBLICATIONS

"Stainless MT Volkswagen VW Polo Bora Lavida Golf MK4 Car pedal Cover for New Beetle Jetta Santana Clutch Gas Brake pedals Pads-in Mounts & Hold . . . " downloaded May 7, 2014, http://www.aliexpress.com/item/3PC-LOT-Car-pedal-Cover-for-Volkswagen-VW-Polo-Bora-Lavida-MT-Stainless-Clutch-Accelerator-Brake/923830186.html#fee%E2%80%A6.
(Continued)

*Primary Examiner* — Daniel D Yabut
(74) *Attorney, Agent, or Firm* — Kenealy Vaidya LLP

(57) ABSTRACT

Some embodiments relate to a cover assembly for use with a vehicular plate member. The cover assembly includes a pad that is over-molded to a resilient member. The pad includes a primary contact member having an exterior surface with a relatively high coefficient of friction and disposed to be frictionally engagable with the vehicle operator's foot, the primary contact member being abradable through frictional engagement with the operator's foot. The pad can also include a connector member that is configured for attachment to the plate member. The cover assembly can also include a secondary contact member between the exterior surface of the primary contact member and the plate member. The secondary contact member is disposed completely below the primary contact member and thereby hidden from view prior to abrasion of the primary contact member, but disposed to frictionally engage the operator's foot subsequent to abrasion of the primary contact member.

17 Claims, 5 Drawing Sheets

(51) Int. Cl.
*G05G 1/60* (2008.04)
*B60T 7/06* (2006.01)

(58) Field of Classification Search
CPC ......... Y10T 74/20912; Y10T 74/20918; Y10T 74/209; Y10T 74/20906; Y10T 74/20894; Y10T 74/20888; Y10T 74/2168; B62M 3/08; B62M 3/086; B60R 3/002
See application file for complete search history.

(56) References Cited

U.S. PATENT DOCUMENTS

| | | | |
|---|---|---|---|
| 1,455,675 A | | 5/1923 | Sinclair |
| 1,562,993 A | | 11/1925 | Stanwood |
| 1,674,849 A | | 6/1928 | Birch |
| 1,763,987 A | * | 6/1930 | Saltzman ............... G05G 1/483 74/563 |
| 1,907,689 A | * | 5/1933 | Vrooman ............... B60R 3/002 280/169 |
| 1,977,415 A | * | 10/1934 | Thorp ................... G05G 1/483 482/79 |
| 2,077,279 A | | 4/1937 | Snell |
| 3,111,861 A | * | 11/1963 | Young ................... G05G 1/483 16/257 |
| 4,084,561 A | | 4/1978 | Miller |
| 4,176,562 A | | 12/1979 | Allert et al. |
| 4,404,439 A | | 9/1983 | Leighton |
| 5,321,995 A | | 6/1994 | Zedan |
| 5,609,069 A | | 3/1997 | Swenson |
| 6,622,592 B2 | | 9/2003 | Lee |
| D526,937 S | | 8/2006 | Colano |
| 7,152,500 B2 | * | 12/2006 | Kanbe ................... B60T 7/045 74/560 |
| 8,656,805 B2 | | 2/2014 | Palacio Argüelles et al. |
| 2002/0080619 A1 | * | 6/2002 | Lin ....................... B60K 26/02 362/488 |
| 2003/0154818 A1 | * | 8/2003 | Lee ....................... G05G 1/483 74/563 |
| 2005/0072263 A1 | | 4/2005 | Gibson |
| 2012/0318098 A1 | | 12/2012 | Bruno |

FOREIGN PATENT DOCUMENTS

| | | | |
|---|---|---|---|
| DE | 10032574 A1 * | 1/2002 | ............... B60T 7/06 |
| DE | 10034525 A1 | 1/2002 | |
| DE | 202004020339 U1 | 5/2005 | |
| DE | 19824755 B4 | 10/2005 | |
| JP | 2000242355 A * | 9/2000 | |
| JP | 2003029859 A | 1/2003 | |

OTHER PUBLICATIONS

"Mopar OEM Dodge Challenger Stainless Steel Pedal Covers," downloaded May 7, 2014, http://www.autotrucktoys.com/dodge-challenger-/Mopar-OEM-Dodge-Challenger-Stainless-Steel-Pedal-Covers--PRD13713.aspx.

* cited by examiner

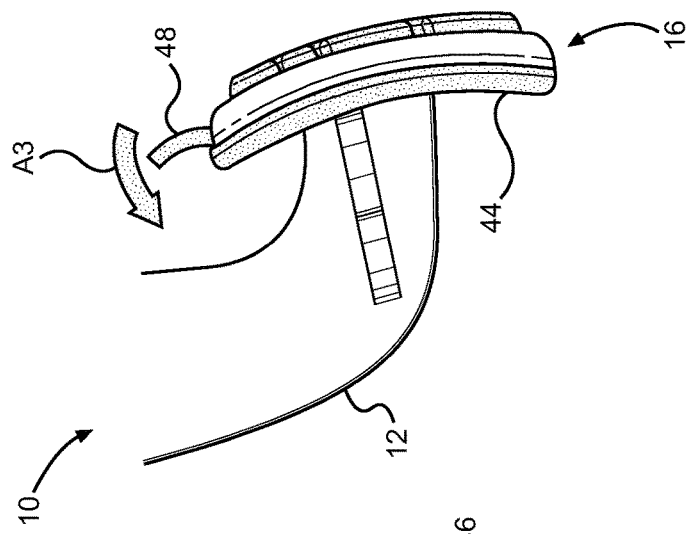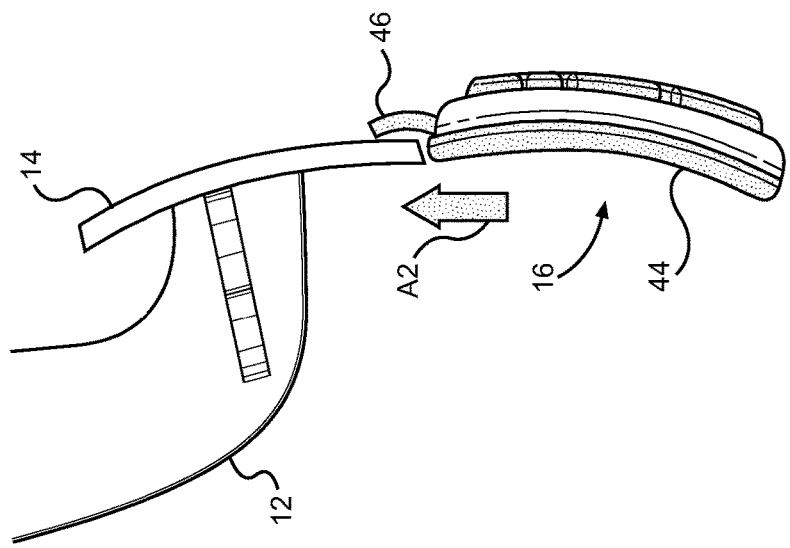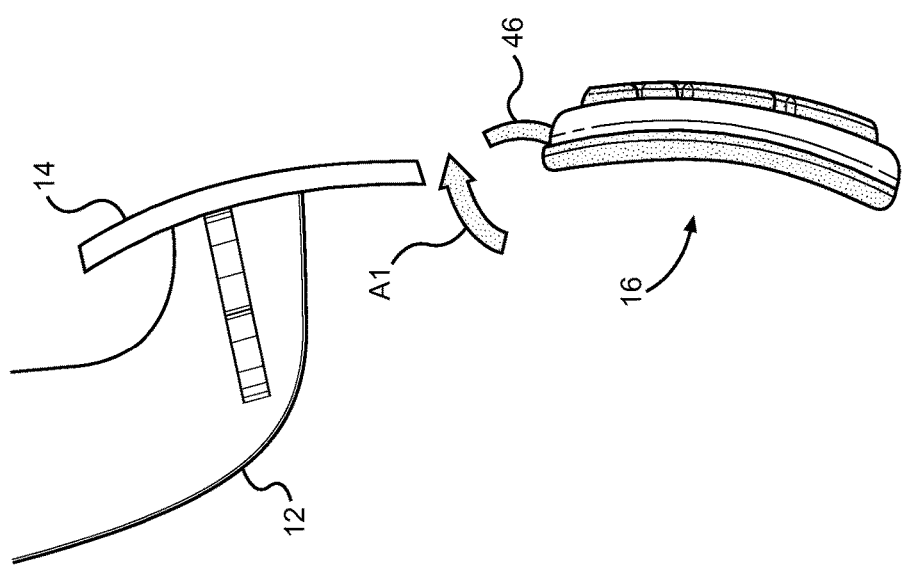

PEDAL COVER ASSEMBLY AND METHODS OF USE AND MANUFACTURE THEREOF

BACKGROUND

The disclosed subject matter relates to vehicular pedals, and methods of use and manufacture thereof. More particularly, the disclosed subject matter relates to pedal cover assemblies that are attachable to, and thereby facilitate manual actuation of, vehicular pedal plates.

Many related art vehicles include manually actuable pedals that instruct various vehicular operations, such as acceleration, braking, shifting of gears, etc. These pedals are typically manually actuable by a vehicular operator's foot. For example, applying pressure to an acceleration pedal via the operator's foot may provide an instruction to increase vehicular acceleration, while decreasing or removing such pressure may instruct a decrease in vehicular acceleration. Similarly, applying pressure to a brake pedal may instruct the vehicle's brake system to increase a vehicular braking force, while decreasing or removing such pressure may instruct a decrease in vehicular braking force.

SUMMARY

Some related art vehicle pedals include a manually actuable pedal plate, which may be formed of resilient material, such as metal, that instructs any of various vehicular operations. However, actuation by directly contacting the pedal plate, such as via the vehicle operator's foot, may be disadvantageous based on the shape, surface area and/or texture of the pedal plate. For example, the pedal plate may be relatively small in size or its shape may otherwise make it relatively difficult to actuate. In addition, or alternatively, the pedal plate may be relatively smooth or otherwise fail to provide sufficient friction with a user's foot to facilitate relatively easy or reliable actuation.

Thus, it may be beneficial to provide a pedal cover assembly that is attachable to the pedal plate to address at least one of the above issues. For example, the pedal cover assembly may include a two piece structure, including a pad, such as formed of rubber or other friction enhancing material, and a resilient garnish, such as formed of metal. The metal garnish can be attached to the pedal plate, such as by rivets that extend through the metal and sandwich the rubber pad between the pedal plate and the metal garnish. The metal garnish can be provided with friction elements, such as by being stamped, in order to enhance friction and thereby reduce or impede foot slippage as the rubber pad wears out.

However, in the above pedal cover assembly, the attachment mechanism to the pedal plate, e.g., rivets, as well as the friction elements, are at least partially exposed at an exterior of the assembly, such as at the surface contacting the vehicle operator's foot and are thereby viewable by the vehicle operator and/or passenger(s). Thus, it may be beneficial to provide a pedal cover assembly where the attachment mechanism to the pedal plate, e.g., rivets, as well as the friction elements, are not exposed at an exterior of the assembly and are thereby not viewable by the vehicle operator and/or passenger(s). For example, this pedal cover assembly configuration may provide enhanced styling flexibility and/or enhanced operational characteristics.

Some embodiments are therefore directed to a cover assembly for use with a vehicular plate member and pivotal lever member. The plate member can be connected to the lever member such that application of pressure to the plate member by a vehicle operator's foot pivots the lever member to thereby instruct at least one vehicular operation. The cover assembly can include a resilient member, and a pad that is over-molded to the resilient member. The pad an include a primary contact member having an front exterior surface with a higher coefficient of friction as compared to the resilient member and disposed to be frictionally engagable with the vehicle operator's foot. The primary contact member can be abradable through frictional engagement with the operator's foot. The pad can also include a connector member that is configured for attachment to the plate member to thereby secure the cover assembly to the plate member. The cover assembly can also include at least one secondary contact member between the exterior surface of the primary contact member and the plate member. The at least one secondary contact member can be disposed completely below the primary contact member so as to be hidden from view prior to abrasion of the primary contact member, but disposed to frictionally engage the operator's foot subsequent to abrasion of the primary contact member.

Some other embodiments are directed to a vehicular pedal assembly that can include a support member, and a vehicular plate member connected to the support member to support a user's foot. The cover assembly can include a resilient member; and a pad that is over-molded to the resilient member. The pad can include a primary contact member having an front exterior surface with a higher coefficient of friction as compared to the resilient member and disposed to be frictionally engagable with the vehicle operator's foot, the primary contact member being abradable through frictional engagement with the operator's foot. The pad can also include a connector member that is configured for attachment to the plate member and thereby secure the cover assembly to the plate member. The cover assembly can also include at least one secondary contact member between the exterior surface of the primary contact member and the plate member, the at least one secondary contact member being disposed completely below the primary contact member so as to be hidden from view prior to abrasion of the primary contact member, but disposed to frictionally engage the operator's foot subsequent to abrasion of the primary contact member.

Still other embodiments are directed to a method of manufacturing a cover assembly for use with a vehicular plate member. The method can include over-molding a pad to a resilient member; and forming the pad to include a primary contact member from a material to provide a front exterior surface with a higher coefficient of friction as compared to the resilient member, and to be abradable through frictional engagement with the operator's foot. The method can also include disposing the primary contact member to be frictionally engagable with the vehicle operator's foot upon attachment of the cover assembly to the plate member; and forming the pad to include a connector member that is configured for attachment to the plate member to thereby secure the cover assembly to the plate member. The method can further include forming at least one secondary contact member between the exterior surface of the primary contact member and the plate member, such that the at least one secondary contact member is completely below the primary contact member and is thereby hidden from view prior to abrasion of the primary contact member, but frictionally engagable with the operator's foot subsequent to abrasion of the primary contact member.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 7 is side view of the pedal assembly of FIG. 1 in a first pre-assembled state.

FIG. 8 is side view of the pedal assembly of FIG. 1 in a second pre-assembled state.

FIG. 9 is side view of the pedal assembly of FIG. 1 in a partially assembled state.

DETAILED DESCRIPTION OF EXEMPLARY EMBODIMENTS

Figure 1:
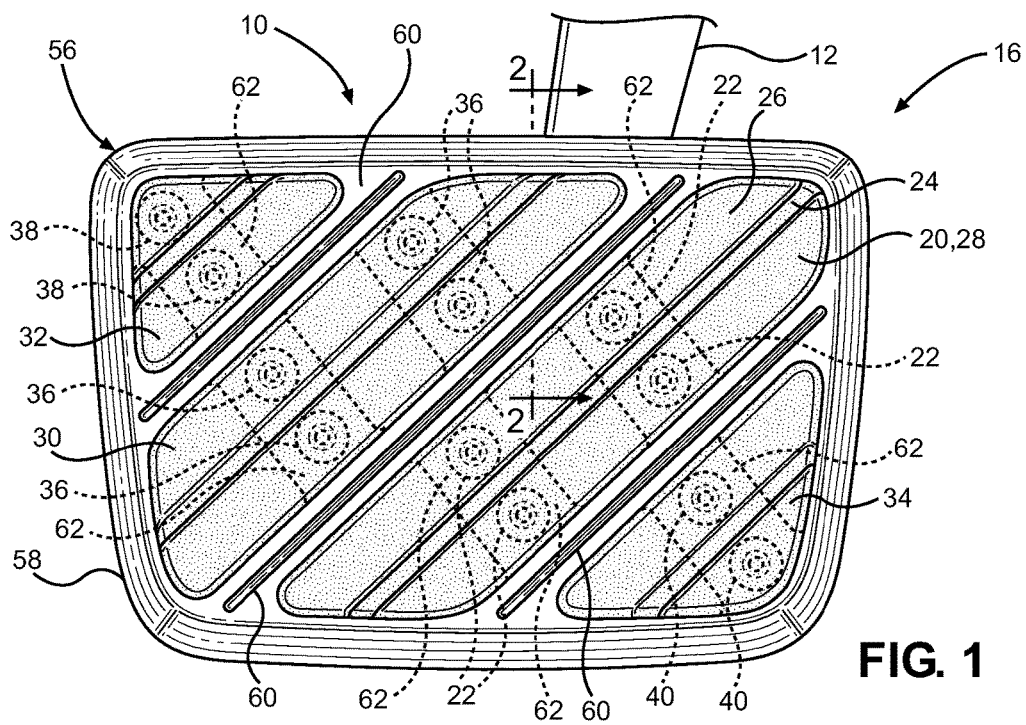
FIG. 1 is a front plan view of a pedal assembly including a pedal cover assembly for a vehicle in accordance with the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Pedal Assembly 10

FIGS. 1-4 illustrate an exemplary embodiment of a vehicular pedal assembly 10 in accordance with the principles of the disclosed subject matter. The pedal assembly 10 can be manually actuable to instruct various vehicular operations, and thus be configured as an accelerator pedal, brake pedal, clutch pedal, parking brake pedal, etc. Thus, the pedal assembly 10 can be operatively connected to modulate the vehicular fuel system, brake system, clutch assembly, or parking brakes system, respectively, in response to an input from a vehicle operator's shod/unshod foot.

However, the pedal assembly 10 can be used in other vehicular applications, such as by being used in other ways to perform different operations. In fact, some embodiments of the pedal assembly 10 can be used in other vehicular applications or non-vehicular applications, such as being used as an immobile foot rest.

The pedal assembly 10 can include a lever member 12, plate member 14 and cover assembly 16. The lever member 12 can be pivotally mounted to the vehicle, such that manually pivoting the lever member 12 instructs a certain operation of the vehicle. The plate member 14 can be connected to the lever member 12 in any appropriate manner (such as but not limited to welding, at least one mechanical fastener, adhesive bonding, friction fit, forming these elements unitarily, etc.) that can permit these elements to perform their required operations. For example, direct or indirect application of pressure, or a release or reduction of such pressure, to the plate member 14 causes the lever member 12 to pivot. In other words, the plate member 14 and the lever member 12 are movable together and substantially immobile relative to each other.

The plate member 14 can have a generally smooth surface facing a main portion of the cover assembly 16 and the vehicle operator. The plate member 14 can be formed from any known, related art, or later developed material, such as metal, metal alloy, synthetic resin, carbon fiber, fiber reinforced plastic, etc. Due to either or both of the surface finish and the material used to form the plate member 14, the plate member 14 can have a relatively low coefficient of friction.

Contrarily, the cover assembly 16 can include at least one member that is configured to provide a relative high coefficient of friction as compared to the plate member 14. Thus, the cover assembly 16 can enhance the frictional engagement between the vehicular operator, such as the operator's foot, and the pedal assembly 10 to thereby reduce or impede foot slippage.

II. Cover Assembly 16

FIGS. 1-11 illustrate an exemplary embodiment of a cover assembly 16 made in accordance with the principles of the disclosed subject matter. The cover assembly 16 can include at least one connector member 18, at least one primary contact member 20 and at least one secondary contact member 22.

Figure 3:
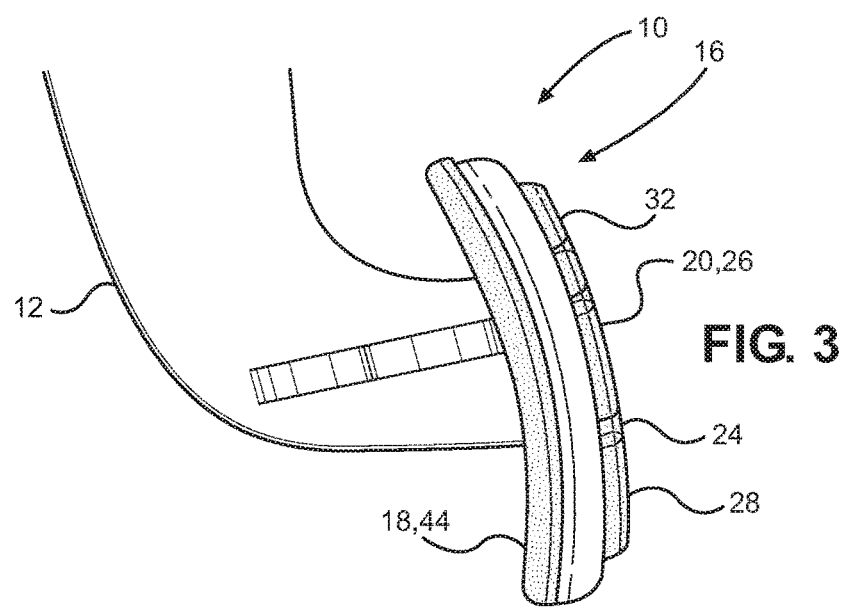
FIG. 3 is side view of the pedal assembly of FIG. 1.
Figure 4:
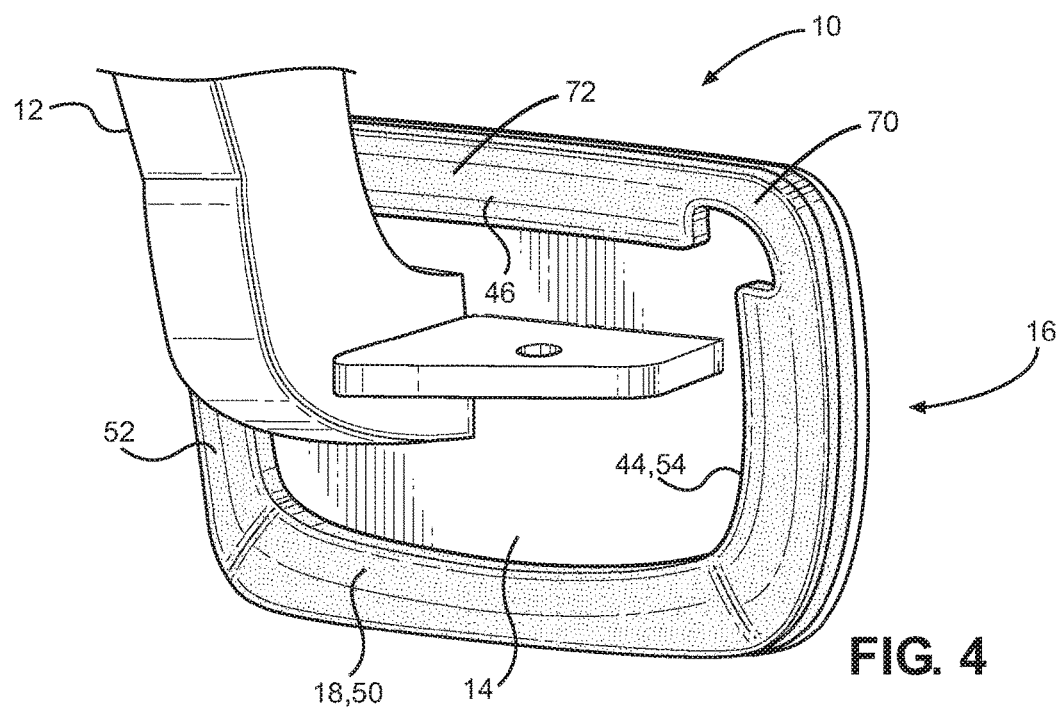
FIG. 4 is a rear perspective view of the pedal assembly of FIG. 1.

As shown in FIGS. 3 and 4, the connector member 18 can be configured to secure the cover assembly 16 to the plate member 14 in any appropriate manner that can permit the cover assembly 16 to move with the lever member 12 and the plate member 14, such as in the case where the lever member 12 pivots. In other words, the connector member 18 renders the cover assembly 16 to be substantially immobile relative to the plate member 14. The primary contact member 20 and the secondary contact member 22 can be directly or indirectly connected to the connector member 18. Further exemplary details of these elements are discussed below.

The primary contact member 20 can be configured to enhance frictional engagement between the primary contact member 20 and the vehicle operator's shod/unshod foot. The secondary contact member 22 can be concealed by at least a portion of the primary contact member 20.

Figure 5:
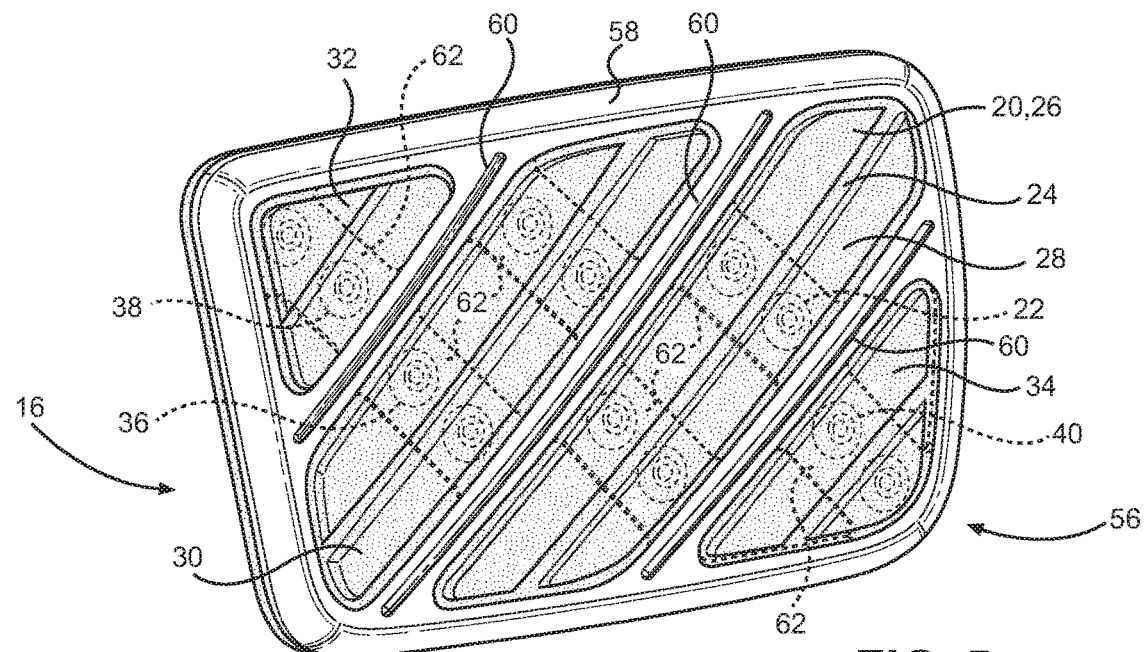
FIG. 5 is a front perspective view of the pedal cover assembly of the pedal assembly of FIG. 1.

As shown in FIGS. 1 and 5, the primary contact member 20 can be configured with any appropriate geometry and/or surface finish, and/or formed from any appropriate known, related art or later developed material, that can enhance frictional engagement between the primary contact member 20 and the operator's shod/unshod foot. Exemplary geometries of the perimeter of the primary contact member 20 can include a circular perimeter, a perimeter defined by a plurality of connected arcuate portions, a polygonal perimeter (such as but not limited to a pentagonal shape, a trapezoidal shape, a rectangular shape, a triangular shape, etc.), a polygonal shape with rounded corners, a polygonal perimeter with one or more arcuate sides, or any combination of arcuate and linear segments connected together to define a perimeter. The primary contact member 20 can have a smooth surface finish, rough surface finish, knurled surface finish, ridged surface finish, etc. The primary contact member 20 can be formed from a natural rubber, synthetic rubber, plastic, metal, metal alloy, carbon fiber, fiber-reinforced plastic, ceramic, any combination of these exemplary materials, etc. In the exemplary embodiment of FIGS. 1-11, the primary contact member 20 can include a substantially pentagonal perimeter and can be formed from natural or synthetic rubber.

As shown in FIGS. 1, 3, and 5, the primary contact member 20 can include at least one recessed surface 24 and at least a pair of contact surfaces 26, 28. The contact surfaces 26, 28 can be spaced apart or otherwise separated by the recessed surface 24. The recessed surface 24 can be provide a pathway for dirt, debris, liquid, etc., to escape from contact with the primary contact member 20 so that the frictional engagement between one or both of the contact surfaces 26, 28 and the vehicle operator can be enhanced or even maximized.

The recessed surface 24 and the contact surfaces 26, 28 can be formed in any appropriate shape, such as but not limited to a substantially flat surface, a curved surface, a plurality of curved surface portions connected together, a plurality of non-parallel flat surface portions connected to together, at least one curved surface portion connected to at least one flat surface portion. Exemplary geometries of the perimeter of the recessed surface 24 and the contact surfaces 26, 28 can include a circular perimeter, a perimeter defined by a plurality of connected arcuate portions, a polygonal perimeter (such as but not limited to a pentagonal shape, a trapezoidal shape, a rectangular shape, a triangular shape, etc.), a polygonal shape with rounded corners, a polygonal perimeter with one or more arcuate sides, or any combination of arcuate and linear segments connected together to define a perimeter. In the exemplary embodiment of FIGS. 1-11, the recessed surface 24 can be formed as a substantially flat surface having a rectangular perimeter, and the contact surfaces 26, 28 can be formed as a substantially flat shape having polygonal perimeter with a plurality of rounded corners and a plurality of angular corners.

As shown in FIGS. 1 and 5, the secondary contact member 22 can be configured to enhance frictional engagement between the secondary contact member 22 and the vehicle operator's shod/unshod foot if the primary contact member 20 is exposed through wear, or is otherwise partially or completely removed from the pedal assembly 10. In other words, the secondary contact member 22 can be configured to enhance frictional engagement upon removal of at least the portion of the primary contact member 20 that previously covered the secondary contact member 22.

The secondary contact member 22 can be configured with any appropriate geometry and/or surface finish, and/or formed from any appropriate material, that can enhance frictional engagement between the secondary contact member 22 and the operator's shod/unshod foot. Exemplary geometries for the secondary contact member 22 can include a frusto-conical shape, conical shape, pyramidal shape, cylinder, polyhedron, polyhedron with rounded corners, substantially polyhedron shape with arcuate sides, or any irregular shape. The secondary contact member 22 can have a smooth surface finish, rough surface finish, knurled surface finish, ridged surface finish, etc. The secondary contact member 22 can be formed from any known, related art or later developed material, including a metal, metal alloy, natural rubber, synthetic rubber, plastic, carbon fiber, fiber-reinforced plastic, ceramic, any combination of these exemplary materials, etc. In the exemplary embodiment of FIGS. 1-11, the secondary contact member 22 can include a hollow frusto-conical shape and can be formed from a metal or metal alloy.

During normal usage of the pedal assembly 10, one or more portions of the primary contact member 20 can become worn away or otherwise separated from the pedal assembly 10. The secondary contact member 22 can be advantageously positioned under one or both of the contact surfaces 26, 28 so that the secondary contact surface 22 can provide an enhance frictional engagement with the vehicle operator's foot if a portion(s) of the primary contact member 20 is abraded during use or otherwise removed from the cover assembly 16. The secondary contact member 22 can be configured to extend under all of the entirety of one or both of the contact surfaces 26, 28, under a majority portion of one or both of the contact surfaces 26, 28, or under a minority portion of one or both of the contact surfaces 26, 28. In the exemplary embodiment of FIGS. 1-11, the cover assembly 16 can include at least one secondary contact member 22 under each of the contact surfaces 26, 28.

Thus, the primary contact member 20 can provide an enhanced frictional engagement between the pedal assembly 10 and the vehicle operator's foot. Upon removal of at least a portion of the primary contact member 20, the secondary contact member 22 can maintain this enhanced frictional engagement, or at least provide a second enhanced frictional engagement between the pedal assembly 10 and the vehicle operator as compared to that available from the plate member 14.

In the exemplary embodiment of FIGS. 1-11, the cover assembly 16 can include a plurality of primary contact members 20, 30, 32, 34 and at least one secondary contact member 22, 36, 38, 40 concealed or otherwise disposed under a respective one of the primary contact members 20, 30, 32, 34. The second primary contact member 30, third primary contact member 32 and fourth primary contact member 34 can be configured as described above with respect to the first primary contact member 20. The second secondary contact member 36, third secondary contact member 38 and fourth primary contact member 40 can be configured as described above with respect to the first secondary contact member 22.

III. Connection Member 18

As shown in FIGS. 2-4 and 6, the connection member 18 can include an intermediate member 42, a first flange 44 and a second flange 46.

The intermediate member 42 can be connected to each of the primary contact members 20, 30, 32, 34. The intermediate member 42 can be connected to a portion of each of primary contact members 20, 30, 32, 34 that is on a side of the primary contact members that is opposite to the contact surfaces 26, 28. Alternatively, the intermediate member 42 may be formed unitarily with any one, multiple or all of the primary contact members 20, 30, 32, 34. The intermediate member 42 can include a rear surface 48 that is on a side of the cover assembly 16 that is opposite to a side of the cover assembly 16 that includes the contact surfaces 26, 28 of the primary contact members 20, 30, 32, 34.

The first and second flanges 44, 46 can be connected to the intermediate member 42, or alternatively be formed unitarily with the intermediate member 42. The first and second flanges 44, 46 can extend away from the rear surface 48 of the intermediate member 42 and across or along a portion of the rear surface 48.

Figure 2:
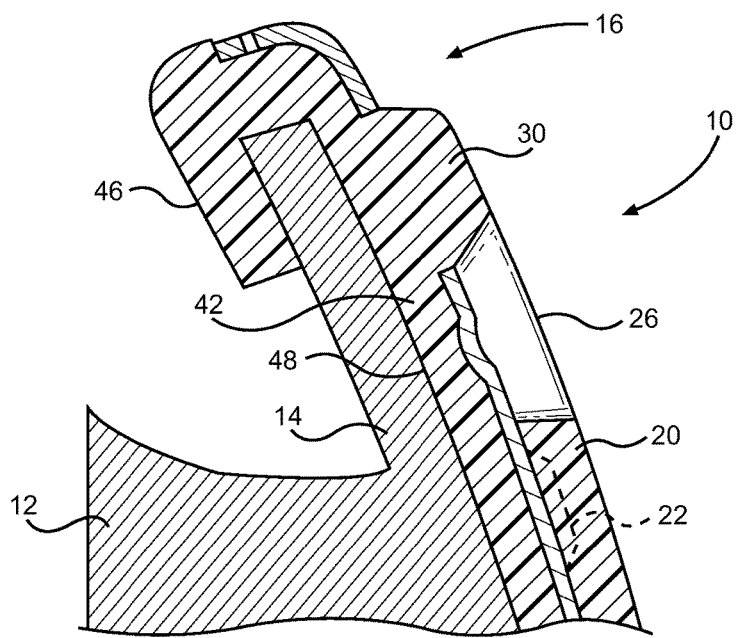
FIG. 2 is a partial cross-sectional view taken along line 2-2 of FIG. 1.

The rear surface 48 can cooperate with the first and second flanges 44, 46 to define first and second channels. FIG. 2 shows the second channel defined by the rear surface 48 and the second flange 46. The first and second channels can be configured with a shape that can be complimentary to the shape of the plate member 14. The first and second flanges 44, 46 can extend along a periphery of the connection member 18.

As shown in FIG. 4, the first flange 44 can be substantially U-shaped with a bottom portion 50 connected between two side portions 52, 54. The second flange 46 can be spaced from the two side portions 52, 54 of the first flange 44, and can constitute a top portion 72 of the connection member 18. The first and second channels can be configured for engagement with the plate member 14. This engagement can be configured as an interference fit. The first and second flanges 44, 46 can be resiliently deformable.

The intermediate member 42, the first flange 44 and the second flange 46 can be formed separately and subsequently connected together in any appropriate manner, such as but not limited to mechanical fastener(s), adhesive bonding, welding, interference fit, etc. However, in the exemplary embodiment of FIGS. 1-11, the intermediate member 42, the first flange 44 and the second flange 46 can be unitarily formed as a single, homogenous unit.

The connection member 18 can be formed from any appropriate known, related art or later developed material, such as but not limited to a natural rubber, synthetic rubber, plastic, metal, metal alloy, carbon fiber, fiber-reinforced plastic, ceramic, any combination of these exemplary materials, etc. In the exemplary embodiment of FIGS. 1-11, the connection member 18 can be formed as a single, homogenous unit from natural or synthetic rubber.

The first and second channels can be configured to provide an interference fit with the plate member 14 so that the plate member 14 can resiliently deform the first and second flanges 44, 46 and the intermediate member 42. This resilient deformation can enhance the frictional engagement between the cover assembly 16 and the plate member 14. As a result, the plate member 14 can be secured within the first and second channels defined by the first and second flanges 44, 46 and the rear surface 48 of the intermediate member 42, without using additional fastening components and/or materials, such as but not limited to a mechanical fastener(s), adhesive bonding, weld(s), etc. Thus, some embodiments do not include any such additional fastening components and/or materials, while other embodiments enable a reduction in these additional fastening components and/or materials.

Figure 6:
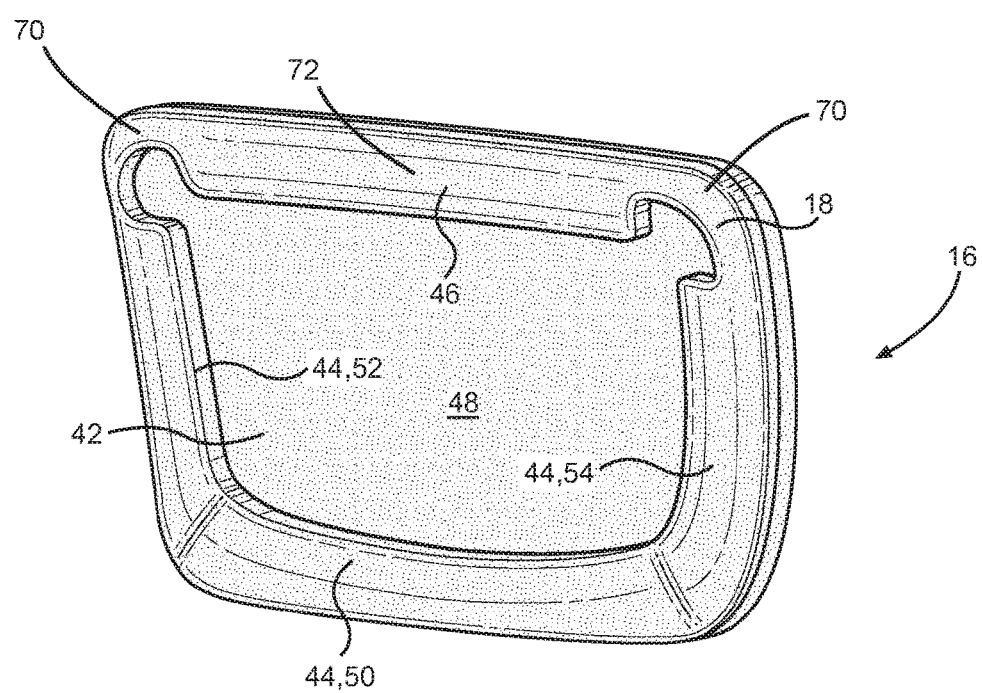
FIG. 6 is a rear perspective view of the pedal cover assembly of the pedal assembly of FIG. 1.
Figure 10:
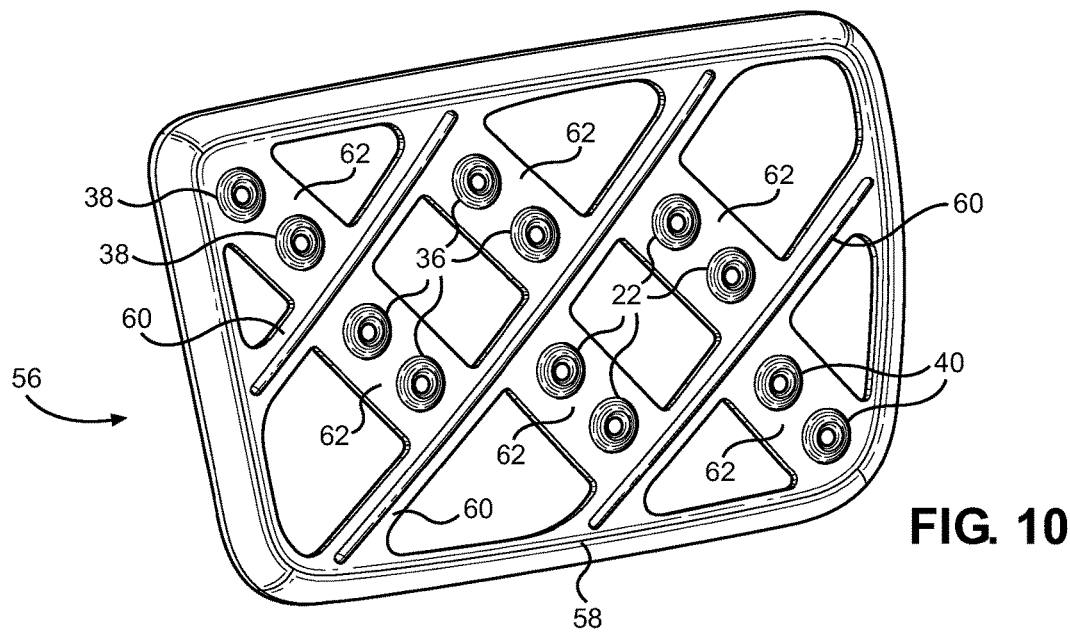
FIG. 10 is a front perspective view of a first member of the pedal cover assembly of the pedal assembly of FIG. 1.
Figure 11:
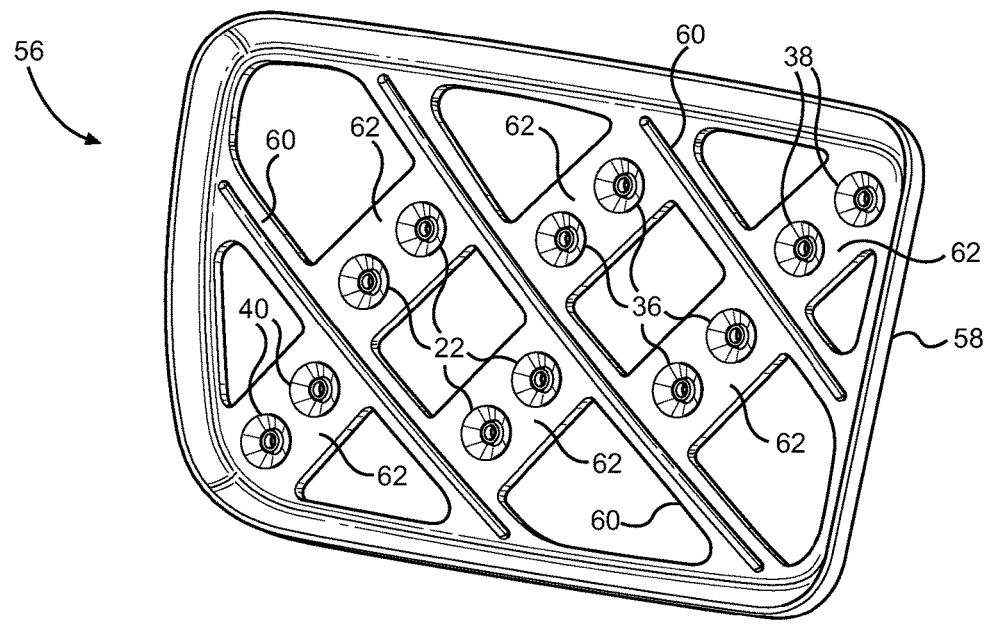
FIG. 11 is a rear perspective view of the first member of the pedal cover assembly of the pedal assembly of FIG. 1.

Referring to FIGS. 4 and 6, the connector member 18 can include a pair of narrow portions 70 that can connect a respective end of the first flange 44 to a respective end of the second flange 46. Each associated narrow portion 70 can space apart each end of the first flange 44 from the respective end of the second flange 46. This spacing can facilitate deflection of the first flange 46 relative to the second flange 48 during installation of the cover assembly 16 onto the plate member 14, as will be described in greater detail below with reference to FIGS. 7-9. As a result, the connector member 18 can simplify assembling the cover assembly 16 to the plate member 14.

The intermediate member 42 can be connected to each of the primary contact members 20, 30, 32, 34 in any appropriate manner, such as but not limited to mechanical fastener(s), adhesive bonding, welding, interference fit, etc. In the exemplary embodiment of FIGS. 1-11, the intermediate member 42 and the primary contact members 20, 30, 32, 34 can be formed from natural or synthetic rubber and molded around the secondary contact members 22, 36, 38, 40 to form a single unit with the secondary contact members 22, 36, 38, 40 embedded in the respective primary contact members 20, 30, 32, 34. As a result, the connection member 18, primary contact members 20, 30, 32, 34, and secondary contact members 22, 36, 38, 40 can be assembled without using (or a reduced number of) additional fastening components and/or materials, such as but not limited to a mechanical fastener(s), adhesive bonding, weld(s), etc.

Thus, the cover assembly 16 can be manufactured at a reduced cost with a reduced or minimum number of process steps and a reduced or minimum number of parts.

IV. Securing Method

A method for securing the cover assembly 16 onto the plate member 14 is discussed below with reference to FIGS. 7-9.

The second flange 46 can be resiliently deformed as indicted by arrow A1 from its normal position shown in FIG. 6 to the position shown in FIGS. 7-9. The side portions 52, 54 of the first flange 44 can be aligned with the plate member 14 so that the plate member 14 can slide into the portions of the first channel defined by the rear surface 48 of the intermediate member 42 and the two side portions of the first flange 44.

Subsequent to alignment, the cover assembly 16 can be moved toward the plate member 14 as indicated by arrow A2 in FIG. 8. The cover assembly 16 can be further moved along the plate member 14 in the direction of arrow A2 until the plate member 14 fully engages the first channel extending along the bottom portion 50 of the first flange 44. After the plate member 14 fully engages the first channel along the bottom portion 50, the resilient bias in the second flange 46 can cause the second flange 46 to move in the direction of arrow A3 of FIG. 9 toward the assembled position shown FIG. 6.

V. Trim Member 56

As shown in FIGS. 1 and 5, the cover assembly 16 can be configured with an aesthetic appearance and/or enhance other operational characteristics. For example, the pedal assembly 16 can include a trim member 56, which can also be referred to as a resilient member. The trim member 56 can be configured with any appropriate geometry and/or surface finish, and/or formed from any appropriate known, related art or later developed material, that can enhance the aesthetic appearance and/or enhance other operational characteristics of the cover assembly 16.

Exemplary geometries of the perimeter of the trim member 56 can include a circular perimeter, a perimeter defined by a plurality of connected arcuate portions, a polygonal perimeter (such as but not limited to a pentagonal shape, a trapezoidal shape, a rectangular shape, a triangular shape, etc.), a polygonal shape with rounded corners, a polygonal perimeter with one or more arcuate sides, or any combination of arcuate and linear segments connected together to define a perimeter. The trim member 56 can have a smooth surface finish, rough surface finish, knurled surface finish, ridged surface finish, etc. The trim member 56 can be formed from a natural rubber, synthetic rubber, plastic, metal, metal alloy, carbon fiber, fiber-reinforced plastic, ceramic, any combination of these exemplary materials, etc. In the exemplary embodiment of FIGS. 1-11, the trim member 56 can include a substantially rectangular perimeter and can be formed from metal or metal alloy.

The trim member 56 can be formed separately from the primary contact members 20, 30, 32, 34 and then connected together by any appropriate manner, such as but not limited to mechanical fasteners, adhesive bonding, welding, interference fit, etc. The trim member 56 and the primary contact members 20, 30, 32, 34 can be integrally or unitarily molded 20, 30, 32, 34 from the same material or from different materials. The trim member 56 can have the same of a different surface finish/texture as the primary contact members 20, 30, 32, 34. The trim member 56 can have the same or different color as the primary contact members 20, 30, 32, 34. In the exemplary embodiment of FIGS. 1-11, the trim member 56 can be formed from a metal or metal alloy, with or without a painted finish.

In the exemplary embodiment of FIGS. 1-11, the secondary contact members 22, 36, 38, 40 and the trim member 56 can be integrally or unitarily formed from a metal or metal alloy as a single homogenous unit. The primary contact members 20, 30, 32, 34 and the connection member 18 can be molded around the integrated trim member 56 and the secondary contact members 22, 36, 38, 40. As a result, the cover assembly 16 can be assembled without using additional fastening components and/or materials, such as but not limited to a mechanical fastener(s), adhesive bonding, weld(s), etc. Thus, an aesthetic embodiment of the cover assembly 16 can be manufactured at a reduced cost with a reduced or minimum number of process steps and a reduced or minimum number of parts.

As shown in FIGS. 1, 5, 10 and 11, the trim member 56 can include a frame member 58, a plurality of decorative or viewable ribs 60 and a plurality of connecting ribs 62. The decorative ribs 60 can be connected to the frame member 58 and the connecting ribs 62 can be connected to the decorative ribs 60. The frame member 58, decorative ribs 60, and connecting ribs 62 can be formed separately and connected together in any appropriate manner, such as but not limited to mechanical fasteners, adhesive bonding, welding, interference fit, etc. In the exemplary embodiment of FIGS. 1-11, the frame member 58, decorative ribs 60, and connecting ribs 62 can be unitarily formed as a single homogenous unit from a metal or metal alloy by any appropriate process, such as but not limited to stamping, molding, machining, etc.

The frame member 58 can extend around the perimeter of the cover assembly 16. The frame member 58 can be positioned such that the primary contact members 20, 30, 32, 34 can lie within the perimeter of the frame member 56. In other words, the frame member 56 can surround the primary contact members 20, 30, 32, 34. The frame member 56 can have any appropriate cross-sectional shape, such as but not limited to circular, arcuate, polygonal, or any combination of these exemplary shapes. In the exemplary embodiment, the frame member 56 can have an arcuate cross-sectional shape.

VI. Ribs 60 and 62

As shown in FIGS. 1, 5, 10 and 11, the decorative ribs 60 can span from one side of the frame member 58 to another side of the frame member 58. The decorative ribs 60 can have any appropriate geometry, such as but not limited to linear, arcuate, circular, polygonal, or any combination of these geometries that can achieve the desired aesthetic appearance. In the exemplary embodiment of FIGS. 1-11, the decorative ribs 62 can be formed as a narrow substantially rectangular decorative rib with a concavity extending along its length. The decorative ribs 60 can be parallel to one another, intersect at least one other decorative rib 60, or be non-parallel and spaced from each other. The decorative ribs 60 can extend diagonally, parallel to one side of the frame member 58, or non-parallel to all sides of the frame member 58. In the exemplary embodiment of FIGS. 1-11, the decorative ribs 60 can extend diagonally from one side of the frame member 58 to another side of the frame member 58. The primary contact members 20, 30, 32, 34 can spaced apart or otherwise separated from each other by the decorative ribs 60.

Each of the connecting ribs 62 can extend from one of the decorative ribs 60 to either another one of the decorative ribs 60 or to the frame member 58. The connecting ribs 62 can have any appropriate geometry such as but not limited to linear, arcuate, circular, polygonal, or any combination of these geometries that can achieve the desired aesthetic appearance. In the exemplary embodiment of FIGS. 1-11, the connecting ribs 62 can be formed as a substantially flat, substantially rectangular connecting rib. The connecting ribs 62 can be parallel to one another, intersect at least one other connecting ribs 62, or be non-parallel and spaced from each other. The connecting ribs 62 can extend diagonally, parallel to one side of the frame member 58, or non-parallel to all sides of the frame member 58. In the exemplary embodiment of FIGS. 1-11, the connecting ribs 62 can extend diagonally from one of the decorative ribs 60 to another one of the decorative ribs 60. The decorative ribs 60 can spaced apart from each other by the connecting ribs 62.

Each of the connecting ribs 62 can include at least one of the secondary contact members 22, 36, 38, 40. In the exemplary embodiment of FIGS. 1-11, each connecting rib 62 can include two of the secondary contact members 22, 36, 38, 40. The connecting ribs 62 can be oriented relative to the recessed surfaces 24 of the primary contact members 20, 30, 32, 34, such that the recessed surfaces 24 can bisect a respective one(s) of the connecting ribs 62 at a level spaced above the respective one(s) of the connecting ribs 62. In other words, the recessed surfaces 24 can extend above and between the respective pair of secondary contact members 22, 36, 38, 40, such that one of the pair can be located under the first contact surface 26, and another one of the pair can be located under the second contact surface 28. As a result, the trim member 56 can provide the cover assembly 16 with an enhanced aesthetic appearance and can ensure proper orientation between the primary contact members 20, 30, 32, 34 and the secondary contact members 22, 36, 38, 40 in a relatively simple, cost effective manner.

The frame member 58, decorative ribs 60, and connecting ribs 62 can be dimensioned to cooperate with one another to define openings in the trim member 56. In an exemplary embodiment, the pedal assembly 16 can be formed by over-molding the trim member 56 with any appropriate material referenced above for the connector member 18 and the primary contact members 20, 30, 32, 34. During this exemplary forming process, the molding material can flow over both sides of the connector ribs 62, over the rear sides of the decorative ribs 60, and though the openings. As a result, the connector ribs 62 can be fully encased in the molding material. Thus, these openings can enhance the connection between the trim member 56, the connector member 18 and primary contact members 20, 30, 32, 34.

VII. Alternative Embodiments

While certain embodiments of the invention are described above, and FIGS. 1-11 disclose the best mode for practicing the various inventive aspects, it should be understood that the invention can be embodied and configured in many different ways without departing from the spirit and scope of the invention.

For example, embodiments are disclosed above in the context of a movable pedal assembly 10. However, embodiments are intended to include or otherwise cover other usages of the cover assembly 16. For example, exemplary embodiments are intended to include cover assemblies used with an immobile foot rest, including those that can be fixed to any appropriate surface in a vehicular passenger compartment. In fact, some embodiments can be used in contexts that are not related to vehicles. In some of the embodiments directed to immobile foot rests, the plate member can be connectable to a support member instead of the pivotal lever member disclosed above. In some of these embodiments, the plate member is integrally or unitarily formed with the support member. In some of these embodiments, the connector member can be configured to connect the pedal assembly to a portion of the vehicle, such as the vehicle floor or wheel well.

Some embodiments omit any one or multiple of the elements and features disclosed above. For example, in accordance with some embodiments, the recessed surface 24 is omitted from the primary contact member 20.

However, the above alternative embodiments are merely provided for exemplary purposes, and as indicated above, embodiments are intended to cover many other types of cover assemblies that differ from the cover assemblies disclosed above.

Embodiments are also intended to include or otherwise cover methods of using and methods of manufacturing the cover assemblies disclosed above. Some of the above embodiments are disclosed as including a metal garnish (including any of the elements that can be formed of metal) and an over-molded rubber pad (including any of the elements that can be formed of natural or synthetic rubber). The garnish can be formed of stamped metal (such as stainless steel, aluminum, etc.) in which the friction elements (secondary contact members 22, 36, 38 and 40) are incorporated in the stamping beneath the over-mold portions of the rubber pad. In this configuration, the over-molded rubber pad hides the friction elements (secondary contact members 22, 36, 38 and 40) from the view of the vehicle operator or passenger(s), and enables installation and securing of the over assembly 16 to the plate member 14, such as by the rubber wrapping around the rear side of the plate member 14.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A cover assembly for use with a vehicular plate member and pivotal lever member, the plate member being connected to the lever member such that application of pressure to the plate member by a vehicle operator's foot pivots the lever member to thereby instruct at least one vehicular operation, the cover assembly comprising:
    a resilient member that is separate and non-unitary from the plate member, the entire resilient member being spaced from the plate member; and
    a pad that is over-molded to the resilient member so as to be disposed between the resilient member and the plate member, the pad including:
        a primary contact member having a front exterior surface with a higher coefficient of friction as compared to the resilient member and disposed to be frictionally engagable with the vehicle operator's foot, the primary contact member being abradable through frictional engagement with the operator's foot;
        a connector member that is configured for attachment to the plate member and thereby secure the cover assembly to the plate member; and wherein the resilient member includes:
        a frame member that extends around a perimeter of the cover assembly,
        multiple first ribs that are exposed to an exterior of the cover assembly and that span from one side of the frame member to another side of the frame member,
        multiple second ribs, each second rib of the multiple second ribs extends from one rib of a respective pair of the multiple first ribs to another rib of the respective pair of the multiple first ribs, and
        at least one secondary contact member between the exterior surface of the primary contact member and the plate member, the at least one secondary contact member being disposed completely below the primary contact member so as to be hidden from view prior to abrasion of the primary contact member, but disposed to frictionally engage the operator's foot subsequent to abrasion of the primary contact member.

2. The cover assembly according to claim 1, wherein the connector is formed at a rear of the pad opposite the front exterior surface of the primary contact member, the connector including an intermediate member and first and second flanges.

3. The cover assembly according to claim 2, wherein the first and second flanges extend around a periphery of the pad, such that first flange and the intermediate member define a first channel therebetween, and the second flange and the intermediate member define a second channel therebetween, the first and second channels extending adjacent to four side surfaces of the plate member.

4. The cover assembly according to claim 3, wherein the first flange is substantially U-shaped and includes a bottom portion connected by parallel side portions, the second flange constitutes a top portion that extends parallel to the bottom portion and between the side portions of the first flange.

5. The cover assembly according to claim 4, wherein the second flange is connected to each of the side portions of the first flange by a narrow connection portion that is more narrow than other portions of the first and second flanges and thereby enables the second flange: 1) to be deformed to adopt an insertion position that enables three of the side surfaces of the plate member to slide into and occupy the first channel, and then 2) returned to an attached position where the remaining fourth side surface of the plate member to occupy the second channel.

6. The cover assembly according to claim 1, wherein the at least one secondary contact member includes multiple contact members that are disposed at the second ribs.

7. The cover assembly according to claim 6, wherein the resilient member is formed of stamped metal, and the secondary contact members are formed into a frusto-conical shape by the stamping.

8. The cover assembly according to claim 6, wherein a pair of secondary contact members is formed at each of the second ribs.

9. The cover assembly according to claim 6, wherein apertures are defined between adjacent second ribs and between second ribs and sides of the frame member, the apertures extending through the resilient member to define openings at opposing ends.

10. A vehicular pedal assembly for supporting a user's foot, comprising:
    a support member;
    a vehicular plate member connected to the support member to support the user's foot; and a cover assembly that includes:
- a resilient member that is separate and non-unitary from the plate member, the entire resilient member being spaced from the plate member; and
- a pad that is over-molded to the resilient member so as to be disposed between the resilent member and the plate member, the pad including:
  - a primary contact member having a front exterior surface with a higher coefficient of friction as compared to the resilient member and disposed to be frictionally engagable with the vehicle operator's foot, the primary contact member being abradable through frictional engagement with the operator's foot; and
  - a connector member that is configured for attachment to the plate member and thereby secure the cover assembly to the plate member;

wherein the resilient member includes:
- a frame member that extends around a perimeter of the cover assembly,
- multiple first ribs that are exposed to an exterior of the cover assembly and that span from one side of the frame member to another side of the frame member,
- multiple second ribs, each second rib of the multiple second ribs extends from one rib of a respective pair of the multiple first ribs to another rib of the respective pair of the multiple first ribs, and
- at least one secondary contact member between the exterior surface of the primary contact member and the plate member, the at least one secondary contact member being disposed completely below the primary contact member so as to be hidden from view prior to abrasion of the primary contact member, but disposed to frictionally engage the operator's foot subsequent to abrasion of the primary contact member.

11. The vehicular pedal assembly according to claim 10, wherein the connector is formed at a rear of the pad opposite the front exterior surface of the primary contact member, the connector including an intermediate member and first and second flanges.

12. The vehicular pedal assembly according to claim 11, wherein the first and second flanges extend around a periphery of the pad, such that first flange and the intermediate member define a first channel therebetween, and the second flange and the intermediate member define a second channel therebetween, the first and second channels being complementary to four side surfaces of the plate member.

13. The vehicular pedal assembly according to claim 12, wherein the first flange is substantially U-shaped and includes a bottom portion connected by parallel side portions, the second flange constitutes a top portion that extends parallel to the bottom portion and between the side portions of the first flange.

14. The vehicular pedal assembly according to claim 13, wherein the second flange is connected to each of the side portions of the first flange by a narrow connection portion that is more narrow than other portions of the first and second flanges and thereby enables the second flange: 1) to be deformed to adopt an insertion position that enables three of the side surfaces of the plate member to slide into and occupy the first channel, and then 2) returned to an attached position where the remaining fourth side surface of the plate member to occupy the second channel.

15. The vehicular pedal assembly according to claim 10, wherein the at least one secondary contact member includes multiple contact members that are disposed at the second ribs.

16. The vehicular pedal assembly according to claim 15, wherein the resilient member is formed of stamped metal, and the secondary contact members are formed into a frusto-conical shape by the stamping, a pair of secondary contact members being formed at each of the second ribs.

17. The vehicular pedal assembly according to claim 15, wherein apertures are defined between adjacent second ribs among the multiple second ribs, and between the second ribs and sides of the frame member, the apertures extending through the resilient member to define openings at opposing ends.

* * * * *